Figures 1, 2:
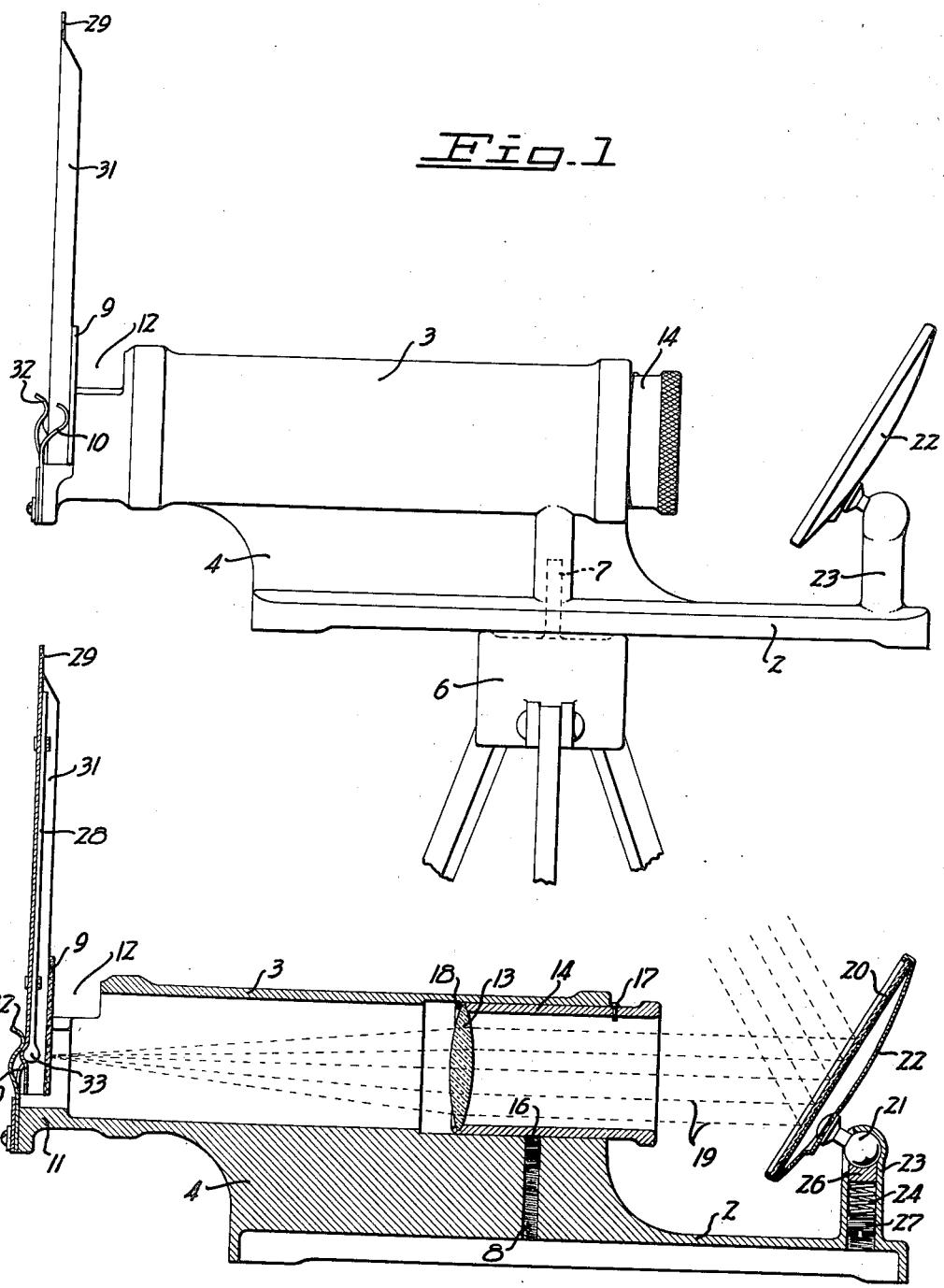

April 9, 1940.   R. M. STEPHENSON   2,196,481
APPARATUS FOR TESTING HEAT RESISTANCE OF MATERIALS
Filed Jan. 31, 1938

INVENTOR
REUBEN M. STEPHENSON
BY Charles J. Evans
HIS ATTORNEY

Patented Apr. 9, 1940

2,196,481

UNITED STATES PATENT OFFICE 2,196,481

APPARATUS FOR TESTING HEAT RESISTANCE OF MATERIALS

Reuben M. Stephenson, Oakland, Calif.

Application January 31, 1938, Serial No. 187,852

2 Claims. (Cl. 73—51)

My invention relates to testing the heat resistance of materials, such as protective covering or roofing materials; and the broad object of the invention is to provide an instrument for demonstrating and calibrating the heat insulating and fire resistant properties of materials.

Another object of my invention is to provide a portable instrument of the character described which may be set up at any convenient place in sun light for purposes of making the tests and demonstrating the heat resisting properties of a material.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a side elevational view of an instrument embodying the improvements of my invention; and Figure 2 is a longitudinal vertical sectional view of the same.

In terms of broad inclusion, my apparatus for testing the heat resistance of materials comprises means for focusing light rays on one side of the material. The fire resisting properties are indicated by the ability of the material to resist burning under the heat of the focused light, and the heat insulating properties are determined by evaluating the temperature rise adjacent the opposite side of the material. The instrument embodying my invention comprises a portable frame having means thereon for holding a sample of the material to be tested. A lens is provided on the frame for focusing light rays on the material, and a thermometer is demountably arranged on the frame behind the material. An adjustable mirror is also preferably provided on the frame for directing suitable light rays, such as sun rays, to the lens.

In greater detail, and referring to the drawing, the instrument of my invention comprises a frame casting having an elongated base 2 and tubular body 3 spaced above the base by a web 4. In operative position the tube 3 is held horizontal by resting the base 2 on any suitable flat surface, or in the absence of such surface the frame may be mounted on a suitable tripod 6 having a stud 7 threaded into a hole 8 provided in the frame.

Tube 3 is open-ended and the material 9 to be tested, such as a sheet of roofing material, is held vertically against the front end of the tube by a pair of spring clips 10 fastened to a shelf projection 11 at the lower edge of the tube. The upper portion of the tube at this end is cut away to provide an opening 12 through which the material being tested may be observed. The sheet 9 is preferably a relatively small sample, say about two inches high and three inches long, which is easily slipped over the end of the tube under clips 10.

Means are provided for focusing light rays on the material 9. For this purpose a lens 13 is mounted in tube 3, preferably on the inner end of a sleeve 14 held in adjusted position by a set screw 16 threaded in hole 8. A stop pin 17 is also preferably set in the sleeve to indicate the point where the lens is in proper focus. The lens is conveniently held on the sleeve by a flange 18 crimped over the rim of the glass. In the assembled instrument, as shown in Figure 2, the light rays 19 are brought to a focus on the inner surface of the material 9 to be tested.

Means are also preferably provided for directing light rays from a suitable source to the lens. In the ordinary use of the instrument sun rays are preferably utilized. This means is preferably a reflector or mirror 20 adjustably mounted on base 2 behind the rear end of tube 3. By making the mirror adjustable it is possible to direct the rays into the tube from various angles of incidence. The mirror mounting comprises a ball and socket joint in which the ball 21 is fastened to the backing plate 22 of the mirror, and the socket is formed by a hollow post 23 on the base. A spring 24 compressed between the ball seat 26 and a screw 27 serves to hold the mirror in a selected position of adjustment.

Means are further provided for evaluating the temperature rise adjacent the side of material 9 opposite the point of focused light. For this purpose a thermometer is arranged behind the material. I preferably use a standard Fahrenheit thermometer comprising a mercury tube 28 mounted on a graduated backing plate 29 with outturned flanges 31. The thermometer is preferably demountably attached to the instrument by a spring clip 32, so that it is secured behind the material with flanges 31 holding bulb 33 spaced behind the rear surface of the material and in line with the axis of tube 3.

In the operation of the instrument it is set up in a place where sun rays may be caught by mirror 20. A sample 9 of material to be tested is then slipped into place in front of the thermometer, and the mirror is adjusted to center the spot of focused light on the material. This spot is very hot and the mercury of the thermometer will start climbing; the degree of temperature rise depending upon the heat resisting properties of the material. With an ordinary asphalt saturated felt roofing, for example, the heat insulating properties are poor and the temperature behind immediately goes up so rapidly that the spot must be removed quickly to prevent breaking the thermometer. On the other hand the same material coated with a good heat resisting paint will show a temperature rise of only a few degrees. Any material may thus be tested and given a heat insulating rating in terms of degrees. Because of its portability and ease of operation the instrument is ideal for showing prospective purchasers the heat insulating properties of a given material in comparison with other materials.

Not only does the instrument indicate the heat insulating properties of a material, but it also demonstrates the fire resisting properties. For this purpose the thermometer is removed and the spot of focused light left on the material. If the material will melt or burn it will do so quickly under the high temperature of the light spot. Thus a sheet of ordinary saturated roofing felt will burn through in a second or two under the focused light, while the same sheet with a good fire resistant paint will not be affected by the heat even though it be exposed to the focused light for long periods.

I claim:

1. An instrument for testing the heat resistance of materials, comprising a tube, means adjacent one end of the tube for holding a sample of the material, a mirror mounted externally of the tube adjacent the other end for directing rays from the sun into the tube, and a lens in the tube for focusing said rays on said material.

2. An instrument for testing the heat resistance of materials, comprising a tube, means adjacent one end of the tube for holding a sample of the material, a mirror mounted externally of the tube adjacent the other end for directing rays from the sun into the tube, a lens in the tube for focusing said rays on said material, and a thermometer arranged behind the material.

REUBEN M. STEPHENSON.